Aug. 29, 1967 G. C. FULLER 3,338,767
PROCESS FOR PRODUCING CORRUGATED PLYWOOD AND APPARATUS THEREFOR
Filed Sept. 16, 1963 2 Sheets-Sheet 2
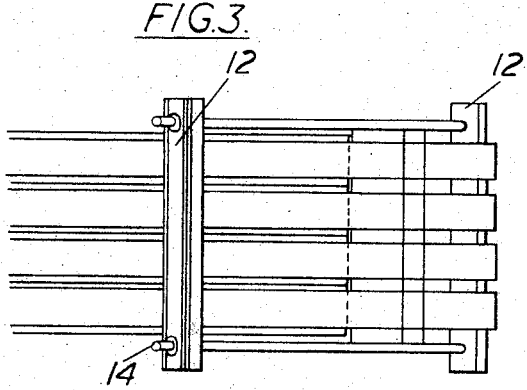
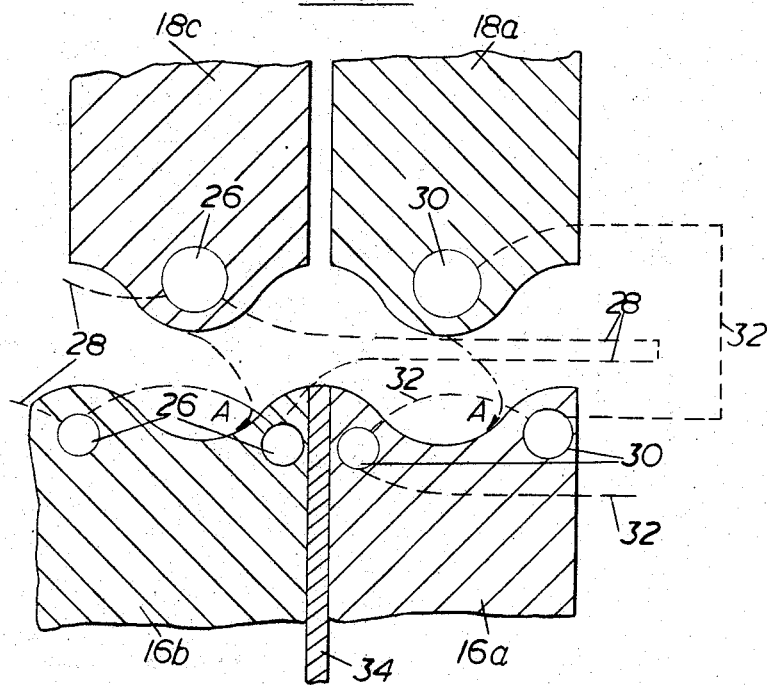
Inventor
George Charles Fuller
By
Burns, Doane, Benedict, Swecker & Mathis
Attorney

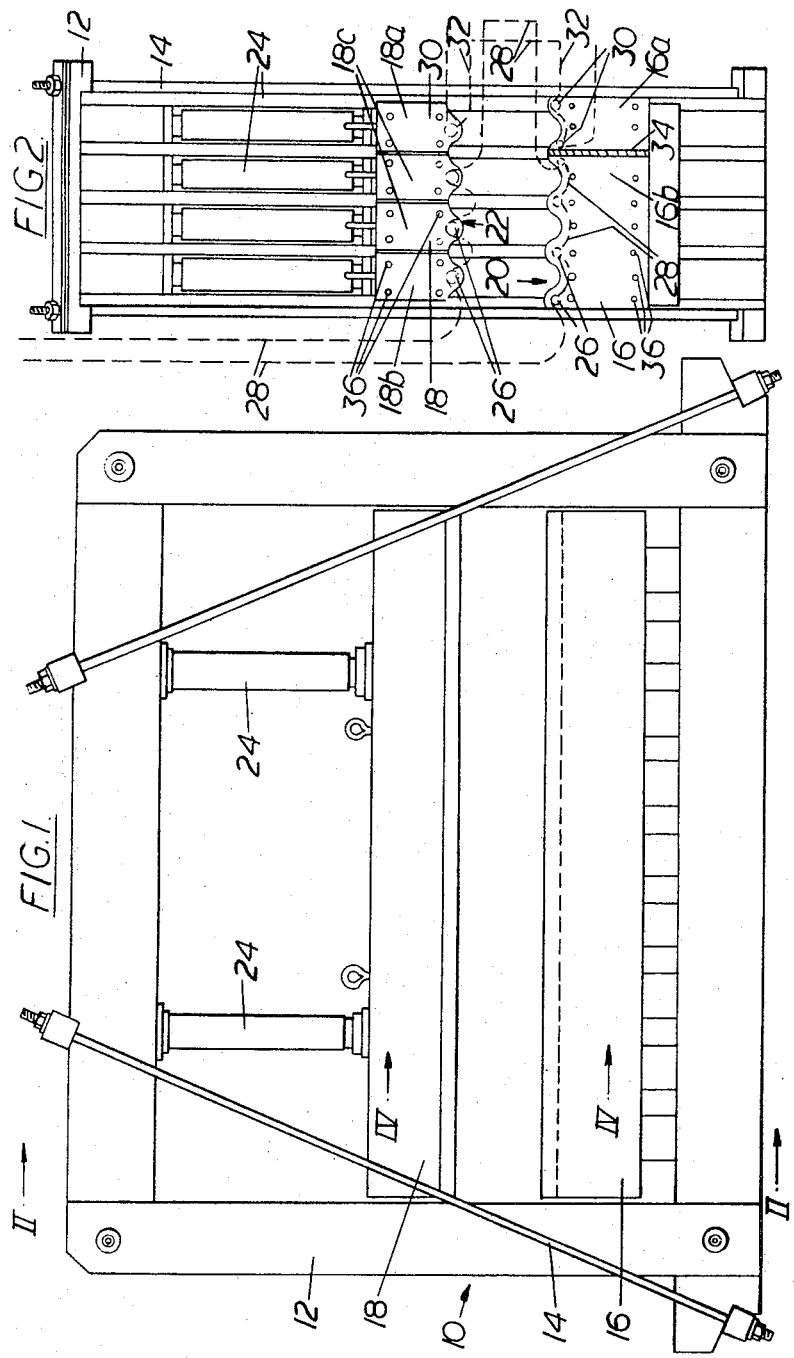

United States Patent Office 3,338,767
Patented Aug. 29, 1967

3,338,767
PROCESS FOR PRODUCING CORRUGATED
PLYWOOD AND APPARATUS THEREFOR
George Charles Fuller, Cape Town, Cape Province, Republic of South Africa, assignor to Fiberply (Proprietary) Limited, Cape Town, Cape Province, Republic of South Africa
Filed Sept. 16, 1963, Ser. No. 309,177
4 Claims. (Cl. 156—206)

This invention relates to a process for the manufacture of plywood, and to apparatus suitable for carrying out the process.

According to a further development thereof, the invention relates also to a process of producing corrugated plywood, and to apparatus suitable for carrying out the process.

According to the invention, there is provided a process for the manufacture of plywood which includes the steps of feeding at least two lengths of wood veneer in a direction transversely to the grain of the veneer, providing a coating of adhesive between the adjacent surfaces of the veneers, pressing the veneers together over their full width along the grain and along a portion of the length transversely to the grain, allowing the adhesive to set, and repeating this procedure cyclically.

The process according to the invention may be slightly modified so that the plywood is corrugated simultaneously with the pressing step to form corrugated plywood, by pressing the veneers together by means of suitably undulated platens, over the full width of the veneers along the grain, and transversely to the grain along that portion of the length corresponding to the pitch of an undulation, allowing the adhesive to set, so forming one corrugation, and repeating the procedure to form a further corrugation; thereby progressively draping the veneers according to the undulated platens to form corrugations.

Heat may conveniently be applied to the veneers during the pressing step in order to facilitate the curing and setting of the adhesive. If desired, the veneers may also be cooled at that unpressed area immediately trailing the area which is being pressed, so as to prevent premature setting of the adhesive.

According to a further feature of the invention, veneers may be held in position for the pressing step by holding in the proper position that portion which has already been pressed and which is immediately before the portion which is to be pressed.

By way of further development, a layer or sheet of a different material may be incorporated between the veneers, or may be secured to one or both of the surfaces of the plywood. For example, a thin gauge metal sheet or foil may be sandwiched between the plywood veneers, being adhesively secured to them. Or a metal sheet or foil may be adhesively secured to the outer surface of one or both of the veneers, or the plywood may be completely sheathed in thin gauge metal sheet or foil.

Alternatively, the layer of different material incorporated between the veneers may comprise a layer of a reinforcing filamentous material. This material may comprise filaments or fibres of natural or synthetic material.

The layer of reinforcing filamentous material may be provided in the form of single strands, or groups of strands, made up of filaments or fibres, to provide plywood having improved tensile strength in a direction parallel to the strands.

The layer of reinforcing filamentous material may also be in the form of a mat of discrete lengths of filaments arranged at random, thereby providing plywood having improved tensile strength in all directions. The discrete lengths of filaments may conveniently be chopped glass fibres.

The adhesive may be applied in any suitable manner to the various faces. For example, spray means may be used for applying the adhesive. Any suitable adhesive may be used. Care must, however, be taken that the heat applied to facilitate curing and setting of the adhesive does not exceed the atmospheric boiling point temperature of the volatiles of the adhesive. For example, if a watery solution of urea-formaldehyde is used as the adhesive, the temperature during the heating step should not exceed about 95° C. at sea level.

The process according to the invention may be used for producing panels of plywood; it also makes possible the production of plywood in continuous lengths.

The invention extends also to apparatus suitable for carrying out the process according to the invention. Such apparatus includes a press having at least one bed platen, and a set of independent pressure platens arranged to co-act with the bed platen and comprising at least two platens disposed side by side and parallel to the width of the press, and each having means for displacing it independently of the other(s) into contact with veneers disposed between them and the bed platen.

The bed platen may conveniently be arranged below the set of independent platens which may form the upper platens, the upper platens being displaceable upwardly and downwardly so as to co-operate with the bed platen for pressing the veneers. The platens may furthermore conveniently be heavy so that the pressure applied to the whole surface area of plywood is of the order of one pound per square inch, the pressure being provided merely by the weight of the platens.

Displacing means may be provided for displacing the platens. The displacing means may include hydraulically or pneumatically operable plunger and cylinder assemblies, or winch means, or screw-threaded shanks, or screw jacks, and may also be arranged to apply pressure greater than that provided by their weight.

The set of independent platens comprises conveniently a locating platen and a press platen, the locating platen being arranged to press on a previously pressed plywood area to locate and hold the wood veneers in position, and the press platen being arranged to press an unpressed area of veneers together.

If desired, the bed platen, or at least one of the independent platens, or both, may be heated by suitable heating means to facilitate curing and setting of the adhesive. For example, the heating means may comprise heating tubes embedded within the platens, means being provided for passing a heating medium through the heating tubes. The heating medium may be hot water, steam, or the like.

In addition, a further independent platen may be provided, and which is unheated, the bed platen having an unheated part separated from the heated part by insulation means, the further unheated platen being arranged to coact with the unheated part of the bed platen to press on an unpressed area of the veneers so as to prevent the adhesive from setting before that area of the veneers comes between the heated pressing platens. These unheated platens may have cooling means, e.g. in the form of cooling tubes, means being provided to pass a coolant medium through the cooling tubes.

The platens may conveniently be of concrete or wood, suitably reinforced where necessary, and faced with metal, if desired. The heating or cooling tubes may serve also as reinforcement. Alternatively the platens may be of metal. Preferably the total area of the set of independent platens, i.e. of the press platen and of the locating platen, equals that of the bed platen.

The apparatus according to the invention may also be slightly modified for the manufacture of corrugated plywood. In apparatus suitable for this purpose, the bed platen has an undulated pressing surface, and the independent platens each have a width corresponding to the pitch of the corrugations and a pressing surface corresponding to one undulation of the undulated surface of the bed platen. The heating platen and cooling platen conveniently have a similar design.

In practice, the last pressed corrugation will serve as the locating corrugation for the next pressing. It is therefore possible to make plywood in continuous sheets by means of the continuous cyclically repeatable process according to this invention.

The platens of the apparatus according to the invention may have pressing surfaces of great smoothness, for example of hard polished metal, with melamine, to give a high gloss finish. If desired, cauls, e.g. of sheet metal, may be used to provide a pressing face of the required degree of smoothness. These cauls may be fed into the apparatus at the same time as the wood veneers, and arranged on one or both of the surfaces thereof. For the production of corrugated plywood, the cauls should be of a material which resumes its original flat appearance for re-use after it has been pressed between the undulated press platens and may, for example, be of spring steel sheet. Cauls have the additional advantage that they protect the surface of the veneers, and cauls of metal also provide equal heat distribution for curing and setting the adhesive regularly.

The invention extends also to the product of the process and apparatus as hereinbefore described.

The invention and the manner in which it may be put into practice will now be described in more detail, with reference to the accompanying drawings, where apparatus for manufacturing corrugated plywood is shown by way of example. It must be understood, however, that the invention is not limited to the embodiment so shown by way of example.

In the drawings:

FIGURE 1 shows a front elevation of an apparatus according to the invention, for producing corrugated plywood;

FIGURE 2 shows a sectional elevation of the apparatus shown in FIGURE 1, cut along line II—II;

FIGURE 3 shows a part plan view of the apparatus of FIGURES 1 and 2; and

FIGURE 4 shows an enlarged cross-sectional detail of a portion of the upper and lower platens, cut along line IV—IV of FIGURE 1.

Referring to the drawings, reference numeral 10 indicates generally a press according to the invention for producing corrugated plywood. The press has a framework 12 of any suitable material, e.g. wood, stabilised by reinforcing rods 14.

The press includes a bed platen 16, and a number of independent upper platens 18. The platen 16 has an undulated pressing suface 20 (see FIGURE 2), while each upper platen 18 has a width corresponding to the pitch of the corrugations, and a pressing surface 22 defining one complete undulation and corresponding to the undulated pressing surface of the bed platen 16.

The upper platens 18 are displaceable upwardly and downwardly to move away from and towards the bed platen 16, and displacing means are provided for this purpose, which may conveniently comprise hydraulically or pneumatically operable plunger and cylinder assemblies 24.

The platens 16 and 18 may conveniently be of a heavy material, so that the required pressure is provided merely by the weight of the platens. The platens may, for example, be of concrete, suitably reinforced, e.g. by reinforcing rods 36 (see FIGURE 2).

The press shown in the drawings has a set of four upper platens 18, namely a locating platen 18b, two pressing platens 18c, and a cooling platen 18a. The purpose and function of these different types of platens will be more fully explained hereinafter. The bed platen 16 has a first portion 16b, and a second portion 16a, the two portions being separated by a strip 34 of insulation material.

Locating platen 18b as well as the two pressing platens 18c and the portion 16b of the bed platen 16 are provided with heating means in the form of heating tubes 26. A heating medium, such as hot water or steam, is passed via flexible tubes 28 through heating tubes 26 for the purpose of heating those platens, so as to facilitate the curing and setting of the adhesive used in producing the plywood.

The cooling platen 18a, on the other hand, as well as the portion 16a of the platen 16, are provided with cooling means in the form of cooling tubes 30. A coolant medium is passed through cooling tubes 30 via flexible tubes 32.

The heating tubes 26 and cooling tubes 30 serve also as reinforcement of the platens.

In use, corrugated plywood is manufactured by feeding two or more layers of wood veneer in a direction transversely to the grain into the apparatus according to the invention from that side where cooling platen 18a is located. An adhesive coating is applied between the adjacent surfaces of two adjacent veneers. When the front end of the veneers reaches the locating platen 18b, the latter moves downwards towards the bed platen 16, and the front area of the veneers is pressed, and simultaneously located and held in position. The pressing platens 18c now move downwards successively into contact with the veneers, the upper platen adjacent to the locating platen 18b moving first to form a second corrugation in the plywood. The other platen 18c moves next to form a third corrugation. These three upper platens 18b and 18c, as well as the portion 16b of the bed platen 16 underneath these platens, are heated, so that the adhesive is cured and set during the pressing process.

Finally the cooling platen 18a moves into contact with the bed platen 16 to form a fourth corrugation, but the adhesive is kept from curing and setting as a result of the cooling effected by the cooling means.

Since only one upper platen 18 presses at a time, the wood veneers are progressively draped according to the undulated pressing surfaces to form corrugations, a length of veneer being taken up from the free part of the total length of wood veneer to form a corrugation, so that the fibres of the veneers are not stretched, ruptured, or broken during the corrugating process.

According to yet a further feature of the invention, the upper platens 18 may be arranged to come down slightly off-centre relative to the undulations of the lower platen 16, an upper platen contacting the lower platen slightly displaced towards the free end of the length of veneers, and then sliding together with the veneers into the valley of the bed platen into proper alignment, in order to ensure that enough veneer material is taken up to form a corrugatoin. This feature is shown diagrammatically by the chain-dotted arrows A in FIGURE 4. It is clear that this feature of the invention entails the provision of platens having very smooth pressing surfaces, or otherwise the use of cauls, in order to prevent damage to the wood fibres during this sliding movement.

The process and apparatus according to the invention may be used for producing panels of corrugated plywood, a number of upper platens corresponding to the number of corrugations required in the panel, being provided. Alternatively, corrugated plywood in continuous lengths may be produced, the layers of wood veneers being progressively fed into the apparatus for a further pressing cycle after each previous pressing cycle.

The width of the upper platens, and simultaneously the pitch of the corrugations of the bed platen, may be varied in practice to produce corrugated plywood having different pitches.

In view of the relatively low pressure which is needed for manufacture in accordance with this process, it is possible to have large areas pressed per pressing operation.

What is claimed is:

1. A process for the manufacture of corrugated plywood which comprises the steps of arranging at least two lengths of wood veneer in superimposed relationship and with their grain disposed substantially parallel, feeding the lengths of wood veneer into a press having undulated pressure platens and in a direction transverse to the grain of the veneer, providing a coating of adhesive between the adjacent surfaces of the veneers, pressing the veneers together over their full width along the grain and along a portion of the length transversely to the grain which corresponds to at least one undulation, cooling the veneers at the unpressed area trailing the area which is being pressed, allowing the adhesive to set in the area being pressed by applying heat to the veneers during the pressing, so forming at least one corrugation, and repeating this procedure to form further corrugations, thereby progressively draping the veneers according to the undulated platens to form corrugations.

2. Apparatus suitable for manufacturing corrugated plywood, which comprises a press having at least one bed platen and a set of independent pressure platens arranged to cooperate independently with the bed platen to execute a pressing action between each pressure platen and the bed platen; in which the bed platen has an undulated pressing surface, the corrugations being disposed parallel to the width of the machine; and in which the set of independent pressure platens comprises at least two platens disposed side by side and parallel to the width of the press, each having a width corresponding to the pitch of the corrugations and a pressing surface corresponding to one undulation of the undulated surface of the bed platen and each having further displacing means for displacing it independently of the other into contact with veneers disposed between them and the bed platen; the arrangement being further such that one of the independent pressure platens is provided with cooling means and the other with heating means, and the bed platen is in two parts namely an unheated part and a heated part, the unheated part being separated from the heated part by insulation means and the unheated part being provided with cooling means, and the cooled pressure platen being arranged to co-operate with the unheated part of the bed platen to press on an unpressed area of the veneers trailing the area being pressed.

3. Apparatus according to claim 2, in which the cooling means is in the form of cooling tubes embedded within the platens, means being provided to pass a coolant medium through the cooling tubes.

4. Apparatus according to claim 2, in which the independent platens are arranged to contact the veneers to be pressed slightly off-centre relative to the undulations of the bed platen, an independent platen being arranged to contact the veneers slightly displaced towards the free end of the length of veneers, and to slide together with the veneers into the valley of the undulated bed platen into proper alignment, so as to ensure that enough veneer material is taken up to form a corrugation.

References Cited

UNITED STATES PATENTS

| | | | |
|---|---|---|---|
| 1,971,780 | 8/1934 | Graham et al. | 161—135 |
| 2,640,517 | 6/1953 | De Mello | 156—591 |
| 2,764,193 | 9/1956 | Knowles | 156—205 XR |
| 2,779,387 | 1/1957 | Schairer | 117—4 |
| 3,003,204 | 10/1961 | Bryant | 161—135 XR |
| 3,037,895 | 6/1962 | Quinn | 156—179 XR |

EARL M. BERGERT, *Primary Examiner.*

M. L. KATZ, *Examiner.*